(12) United States Patent
Sridhara et al.

(10) Patent No.: US 9,451,593 B2
(45) Date of Patent: Sep. 20, 2016

(54) MULTICHANNEL TDMA MECHANISM

(75) Inventors: Vinay Sridhara, Santa Clara, CA (US);
Santosh P. Abraham, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 13/217,040

(22) Filed: Aug. 24, 2011

(65) Prior Publication Data
US 2012/0051334 A1 Mar. 1, 2012

Related U.S. Application Data

(62) Division of application No. 12/266,848, filed on Nov. 7, 2008.

(60) Provisional application No. 61/091,782, filed on Aug. 26, 2008.

(51) Int. Cl.
*H04W 72/04* (2009.01)
*H04J 3/00* (2006.01)
*H04L 5/00* (2006.01)

(52) U.S. Cl.
CPC ........ *H04W 72/0406* (2013.01); *H04L 5/0007* (2013.01); *H04L 5/0032* (2013.01); *H04L 5/0094* (2013.01); *H04W 72/0453* (2013.01)

(58) Field of Classification Search
CPC .......... H04B 7/2681; H04W 56/0005; H04W 72/04; H04W 92/10
See application file for complete search history.

(56) References Cited

U.S. PATENT DOCUMENTS

| 5,697,059 | A | 12/1997 | Carney |
| 7,180,877 | B1 | 2/2007 | Benveniste |
| 7,656,965 | B2 * | 2/2010 | Shapira ............... H04L 25/0206 375/146 |
| 2003/0227935 | A1* | 12/2003 | Alapuranen .......... H04L 1/0023 370/437 |
| 2005/0138199 | A1* | 6/2005 | Li ..................... H04W 74/0891 709/236 |

(Continued)

FOREIGN PATENT DOCUMENTS

| CN | 1973492 A | 5/2007 |
| CN | 101047429 A | 10/2007 |

(Continued)

OTHER PUBLICATIONS 802.11 TGN Working Group: "IEEE 802.11n Part 11: Wireless LAN Medium Access Control (MAC) and (PHY) Specification: enhancements for Higher Throughput" IEEE 802.11 Standards, Aug. 14, 2008, XP002528542.

(Continued)

*Primary Examiner* — David Oveissi
(74) *Attorney, Agent, or Firm* — Dang M. Vo

(57) ABSTRACT

An apparatus and method for communications are disclosed. The apparatus may include a transceiver, and a processing system configured to dynamically allocate a plurality of channels to one or more nodes prior to a data transmission from the transceiver to the one or more nodes. Further, an access terminal and method for communications are disclosed, wherein the access terminal may include a processing system configured to receive from another access terminal a dynamic allocation of a plurality of channels prior to a data transmission, and a transceiver configured to receive the data transmission from the other access terminal on the channels.

26 Claims, 13 Drawing Sheets

(56) References Cited

U.S. PATENT DOCUMENTS

| | | | |
|---|---|---|---|
| 2007/0153760 A1* | 7/2007 | Shapira | H04B 7/2681 370/350 |
| 2007/0286226 A1* | 12/2007 | Yoon | H04L 1/1607 370/445 |
| 2008/0171552 A1 | 7/2008 | Hyon et al. | |
| 2008/0260051 A1* | 10/2008 | Boccardi | H04B 7/0452 375/259 |
| 2009/0103501 A1 | 4/2009 | Farrag et al. | |
| 2009/0213815 A1* | 8/2009 | Sherman | H04W 74/0841 370/336 |
| 2010/0054230 A1 | 3/2010 | Sridhara et al. | |

FOREIGN PATENT DOCUMENTS

| | | |
|---|---|---|
| WO | 2005083965 A1 | 9/2005 |
| WO | WO2006000955 A1 | 1/2006 |
| WO | WO2007048118 | 4/2007 |

OTHER PUBLICATIONS

International Search Report—PCT/US09/032250, International Search Authority—European Patent Office—Jun. 4, 2009.

O. Aboul-Magd et al.: "JOINT see-Mesh/Wi-Mesh Propasal to 802.11 TGs Overview" IEEE 802.11 Standards, Mar. 16, 2006, XP002528543.

Written Opinion—PCT/US09/032250, International Search Authority—European Patent Office—Jun. 4, 2009.

Taiwan Search Report—TW098103304—TIPO—Apr. 15, 2012.

\* cited by examiner

MULTICHANNEL TDMA MECHANISM

CROSS-REFERENCE TO RELATED APPLICATIONS

The present Application for Patent is a Divisional of application Ser. No. 12/266,848 entitled "MULTICHANNEL TDMA MECHANISM" filed on Nov. 7, 2008 which claims priority to Provisional Application No. 61/091,782 entitled "MULTICHANNEL TDMA MECHANISM" filed on Aug. 26, 2008, both of which are assigned to the assignee hereof and hereby expressly incorporated by reference herein.

BACKGROUND

I. Field

The following description relates generally to communication systems, and more particularly to multichannel communication systems.

II. Background

In order to address the issue of increasing bandwidth requirements that are demanded for wireless communications systems, different schemes are being developed to allow multiple user terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

In a wireless network having multiple users, as the physical layer data rates increase, MAC protocol efficiency decreases due to associated overhead. One way to alleviate this problem is to perform time division multiplexing among the multiple users. This reduces the amount of overhead associated with certain common factors, such as preamble. Also, this reduces the overhead associated with the mandatory spacing that needs to be provided between different packet transmissions. When considering the unlicensed spectrum available for the 802.11 WLAN systems, there exists a large amount of available bandwidth for packet transmissions. Typically the bandwidth is split into different channels that are 20 MHz wide. If more than one single channel is free in a distribution system, better utilization of this resource will enable higher aggregate throughputs. Consequently, it would be desirable to address one or more of the deficiencies described above.

SUMMARY

According to an aspect of the disclosure, an apparatus for communications includes a transceiver, and a processing system configured to dynamically allocate a plurality of channels to one or more nodes prior to a data transmission from the transceiver to the one or more nodes.

According to another aspect of the disclosure, an apparatus for communications includes a processing system configured to provide information to a node prior to a data transmission from the node to the apparatus, the information relating to one or more free channels seen by the processing system, and a transceiver configured to receive the data transmission on at least one of the one or more free channels.

According to a further aspect of the disclosure, an access terminal includes a processing system configured to receive from another access terminal a dynamic allocation of a plurality of channels prior to a data transmission, and a transceiver configured to receive the data transmission from said another access terminal on the channels.

According to yet a further aspect of the disclosure, a method for communications includes dynamically allocating a plurality of channels to one or more nodes prior to a data transmission from a transceiver to the one or more nodes.

According to another aspect of the disclosure, a method for communications includes providing information to a node prior to a data transmission from the node to the method, the information relating to one or more free channels seen, and receiving the data transmission on at least one of the one or more free channels.

According to yet another aspect of the disclosure, a method for communications includes receiving from another access terminal a dynamic allocation of a plurality of channels prior to a data transmission, and receiving the data transmission from said another access terminal on the channels.

According to yet a further aspect of the disclosure, an apparatus for communications includes means for providing a plurality of channels, and means for dynamically allocating the plurality of channels to one or more nodes prior to a data transmission from a transceiver to the one or more nodes.

According to yet a further aspect of the disclosure, an apparatus for communications includes means for providing information to a node prior to a data transmission from the node to the apparatus, the information relating to one or more free channels seen, and means for receiving the data transmission on at least one of the one or more free channels.

According to yet a further aspect of the disclosure, an access terminal includes means for receiving from another access terminal a dynamic allocation of a plurality of channels prior to a data transmission, and means for receiving the data transmission from said another access terminal on the channels.

According to yet a further aspect of the disclosure, an access point includes a wireless network adapter configured to support a backhaul connection for a peer node to a network, a transceiver, and a processing system configured to dynamically allocate a plurality of channels to one or more nodes prior to a data transmission from the transceiver to the one or more nodes.

According to yet a further aspect of the disclosure, an access terminal includes a processing system configured to provide information to a node prior to a data transmission from the node to the apparatus, the information relating to one or more free channels seen by the processing system, a transceiver configured to receive the data transmission on at least one of the one or more free channels, and a user interface supported by the processing system.

According to yet a further aspect of the disclosure, a computer-program product for communication includes a machine-readable medium encoded with instructions executable to dynamically allocate a plurality of channels to one or more nodes prior to a data transmission from a transceiver to the one or more nodes.

According to yet a further aspect of the disclosure, a computer-program product for communication includes a machine-readable medium encoded with instructions executable by a processing system to provide information to a node prior to a data transmission from the node, the information relating to one or more free channels seen by the processing system, and receive the data transmission by a transceiver on at least one of the one or more free channels.

According to yet a further aspect of the disclosure, a computer-program product for communication includes a machine-readable medium encoded with instructions executable to receive from an access terminal a dynamic allocation of a plurality of channels prior to a data transmission, and receive the data transmission from the access terminal on the channels.

BRIEF DESCRIPTION OF THE DRAWINGS

These and other sample aspects of the invention will be described in the detailed description that follow, and in the accompanying drawings, wherein.

Figure 1:
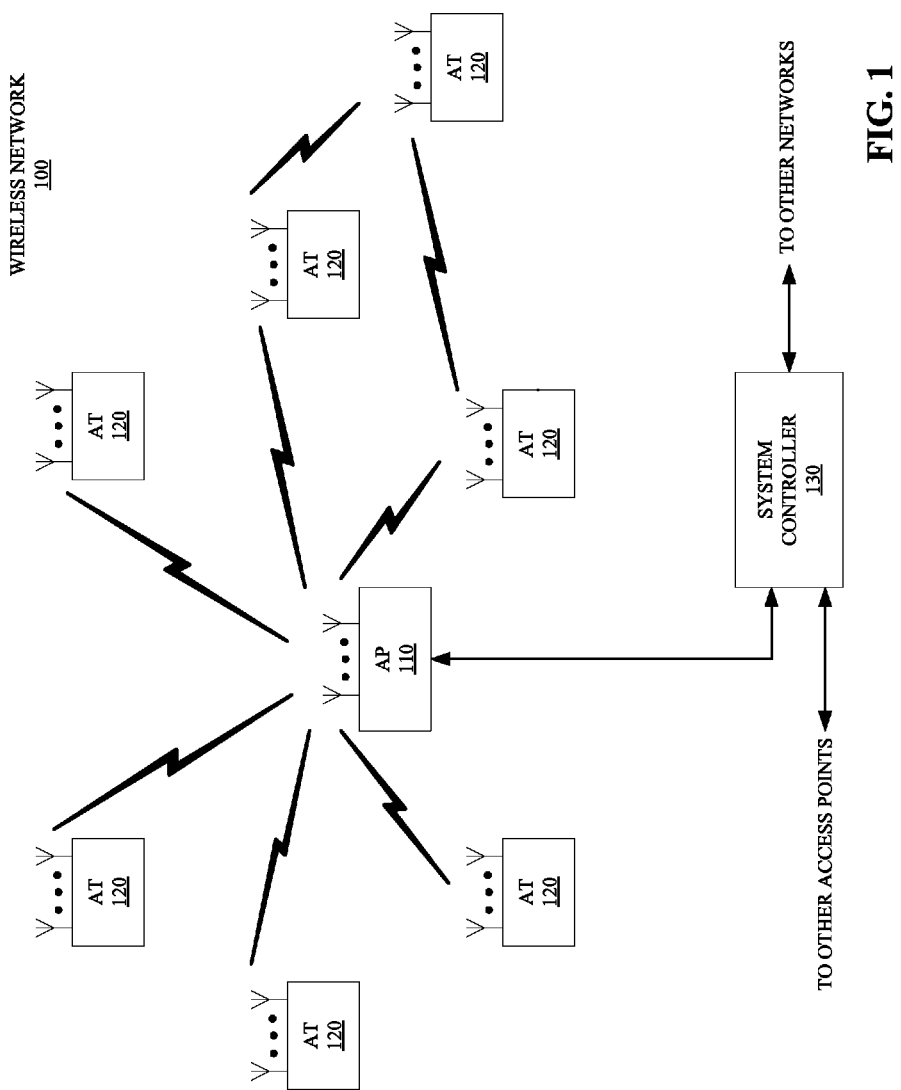
FIG. 1 is a diagram of a wireless communications network.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the invention are described more fully hereinafter with reference to the accompanying drawings. This invention may, however, be embodied in many different forms and should not be construed as limited to any specific structure or function presented throughout this disclosure. Rather, these aspects are provided so that this disclosure will be thorough and complete, and will fully convey the scope of the invention to those skilled in the art. Based on the teachings herein one skilled in the art should appreciate that that the scope of the invention is intended to cover any aspect of the invention disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect of the invention disclosed herein may be embodied by one or more elements of a claim.

Several aspects of a wireless network will now be presented with reference to FIG. 1. The wireless network 100 is shown with several wireless nodes, generally designated as nodes 110 and 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage, however, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an access point 110 may communicate with multiple access terminals 120 simultaneously using Spatial Division Multiple Access (SDMA). SDMA is a multiple access scheme which enables multiple streams transmitted to different receivers at the same time to share the same frequency channel and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enables each access terminal 120 to recover the data stream destined for that access terminal 120. On the uplink, each access terminal 120 transmits a spatially precoded data stream, which enables the access point 110 to identify the source of each spatially precoded data stream.

One or more access terminals 120 may be equipped with multiple antennas to enable certain functionality. With this configuration, multiple antennas at the access point 110 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the invention will be described with reference to a MIMO system supporting any suitable wireless technology, such as Orthogonal Frequency Division Multiplexing (OFDM). OFDM is a technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement with IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this invention is not limited to any particular wireless technology and/or air interface standard.

The wireless node, whether an access point or access terminal, may be implemented with a protocol that utilizes a layered structure that includes a physical (PHY) layer that implements all the physical and electrical specifications to interface the wireless node to the shared wireless channel, a Medium Access Control (MAC) layer that coordinates access to the shared wireless channel, and an application layer that performs various data processing functions including, by way of example, speech and multimedia codecs and graphics processing. Additional protocol layers (e.g., network layer, transport layer) may be required for any particular application. In some configurations, the wireless node may act as a relay point between an access point and access terminal, or two access terminals, and therefore, may not require an application layer. Those skilled in the art will be readily able to implement the appropriate protocol for any wireless node depending on the particular application and the overall design constraints imposed on the overall system.

Figure 2A:
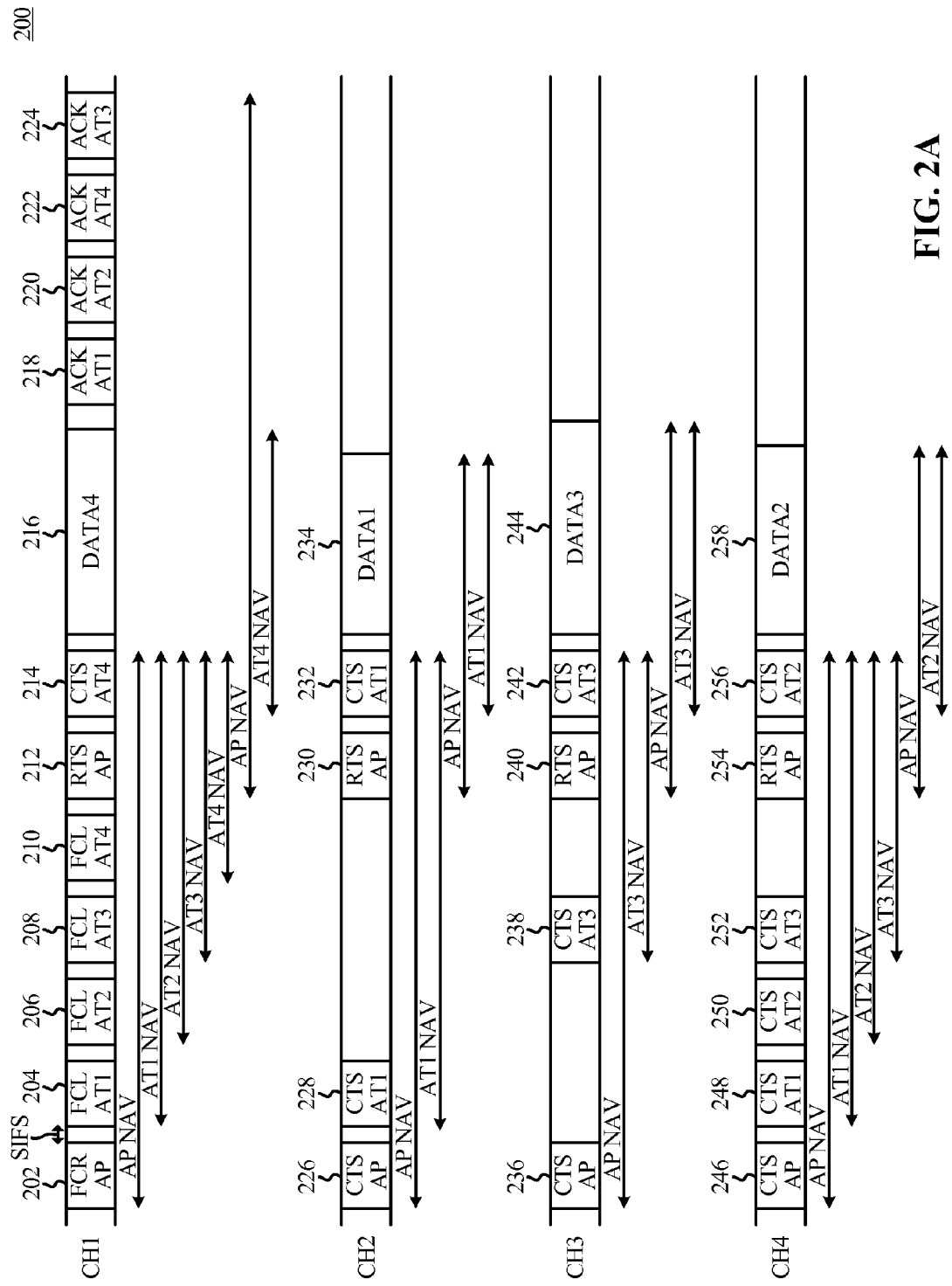
FIG. 2A illustrates a time line of message events in a channel allocation mechanism.

FIG. 2A illustrates a time line of message events in a channel allocation mechanism 200. In FIG. 2A, an access point (AP) exchanges messages with four access terminals AT1, AT2, AT3, AT4 over four channels CH1, CH2, CH3, CH4. Specifically, the AP is configured to dynamically allocate the channels to the access terminals. It should be noted that the number of access terminals and channels is not limited, and the AP may allocate any number of channels to any number of access terminals AT, as required by circumstances.

The AP may correspond to the AP 110 in FIG. 1, and the access terminals AT1-AT4 may correspond to the various access terminals AT 120 within the wireless network 100.

The AP initiates channel allocation by broadcasting or multicasting a message containing a list of channels that are available and that the AP can support. This message may be referred to as a free channel request (FCR) message or some other nomenclature. For example, as shown in FIG. 2A, the available channels supported by the AP are channels CH1, CH2, CH3, CH4. The AP may broadcast or multicast FCR AP 202 across channel CH1 to the access terminals AT1-AT4. The FCR message may be a broadcast or multicast message including the list of supported and available channels, as well as schedules for the access terminals AT1-AT4 to respond to the AP. The FCR AP 202 message triggers each of the access terminals AT1-AT4 to determine which of the channels CH1-CH4 is available for communication. It should be noted that channel CH1 is available to the AP and all of the access terminals AT1-AT4, and may be regarded as a primary channel across which the AP and the access terminals may communicate. Furthermore, the channels CH2, CH3, CH4 may be secondary channels available to the AP, but not necessarily available to some of the access terminals AT1-AT4. When broadcasting the FCR AP 202 across channel CH1, the AP also broadcasts a message indicating to the access terminals AT1-AT4 that the access terminals are free to transmit a response across the channels indicated in the free channel request message. This message may be referred to as a clear-to-send (CTS) message or some other nomenclature. For example, as shown in FIG. 2A, the AP broadcasts messages CTS AP 226, 236, 246 across channels CH2, CH3, CH4, respectively. As will be described later, the CTS message may also serve as a channel reservation message.

In response to the FCR AP 202 message, each of the access terminals AT1-AT4 determines which channels are available and responds to the AP with a response message including a list of the channels available to the corresponding access terminal. This message may be referred to as a free channel list response (FCL) message or some other nomenclature. As shown in FIG. 2A, the FCL messages are transmitted to the AP across channel CH1 according to the response schedule embedded within the FCR AP 202 message. For example, the access terminals AT1-AT4 transmit FCL AT1 204, FCL AT2 206, FCL AT3 208, and FCL AT4 210 to the AP, respectively, in a sequential manner. Such transmissions, however, need not necessarily be sequential, but may be simultaneous, as later described with reference to FIGS. 5-7. In addition to transmitting the FCL message to the AP, each of the access terminals AT1-AT4 transmits a CTS message to the AP on each channel that is available to that access terminal. For example, channels CH1, CH2, CH4 may be the only channels available to the access terminal AT1, and thus, it transmits CTS AT1 228 across channel CH2 and CTS AT1 248 across channel CH4, as well as the FCL AT1 204 across channel CH1, as scheduled by the FCR AP 202 message. Similarly, only channels CH1 and CH4 may be available to the access terminal AT2, and thus, it transmits CTS AT2 250 across channel CH4, as well as the FCL AT2 206 across channel CH1. Channels CH1, CH3, CH4 may be the only channels available to the access terminal AT3, and thus, it transmits CTS AT3 238 across channel CH3 and CTS AT3 252 across channel CH4, as well as the FCL AT3 208 across channel CH1. Channel CH1 may be the only channel available to the access terminal AT4, and thus, it only transmits the FCL AT4 210 across channel CH1.

Once the AP receives all of the FCL and CTS messages from the access terminals AT1-AT4, the AP may then compute a data transmission schedule to the access terminals AT1-AT4 and allocate one or more of the channels CH1-CH4 to each of the access terminals. The computation of the data transmission schedule and channel allocation may be based on one or a plurality of factors, such as, for example, the number of channels available to each of the access terminals, channel quality, channel bandwidth, and the amount of data to be sent to each of the access terminals. In the example shown in FIG. 2A, the AP allocates channel CH1 to access terminal AT4, channel CH2 to access terminal AT1, channel CH3 to access terminal AT3, and channel CH4 to access terminal AT2. The AP then broadcasts messages indicating to each one of the respective access terminals AT1-AT4 that the AP is preparing to transmit data to that access terminal across the channel allocated to that access terminal. This message may be referred to as a request-to-send (RTS) message or some other nomenclature. For example, as shown in FIG. 2A, the AP transmits RTS AP 212, 230, 240, 254 across the channels CH1-CH4, respectively. Alternatively, the AP may broadcast an identical RTS message across all of the channels CH1-CH4, where the RTS includes a channel allocation schedule for all of the access terminals AT1-AT4.

Upon receipt of one of the respective RTS AP messages 212, 230, 240, 254, each of the access terminals AT1-AT4 transmits a message to the AP across its respective channel, as allocated by the AP, indicating to the AP that the AP is free to transmit data across the allocated channel. Such a message may also be referred to as a CTS message or some other nomenclature. For example, as shown in FIG. 2A, access terminal AT1 transmits CTS AT1 232 to the AP across channel CH2, access terminal AT2 transmits CTS AT2 256 to the AP across channel CH4, access terminal AT3 transmits CTS AT3 242 to the AP across channel CH3, and access terminal AT4 transmits CTS AT4 214 to the AP across channel CH1.

Once the AP receives the CTS messages 214, 232, 242, and 256, it transmits data blocks DATA1 234, DATA2 258, DATA3 244, and DATA4 216 to the access terminals AT1-AT4, respectively, across their respective allocated channels. For example, as shown in FIG. 2A, the AP transmits data block DATA4 216 to access terminal AT4 across channel CH1, transmits data block DATA1 234 to access terminal AT1 across channel CH2, transmits data block DATA3 244 to access terminal AT3 across channel CH3, and transmits data block DATA2 258 to access terminal AT2 across channel CH4. Each of the data blocks 216, 234, 244, and 258 may include one or more physical layer data packets or any portion thereof, different types of data of varying size, and include a header with an acknowledgement (ACK) transmission schedule for the respective access terminal, among other information.

After the access terminals AT1-AT4 receive the respective data blocks DATA1-DATA4, the access terminals AT1-AT4 transmit ACK messages ACK AT1 218, ACK AT2 220, ACK AT4 222, and ACK AT3 224 to the AP via channel CH1, according to the embedded ACK transmission schedule in the respective data blocks DATA1-DATA4. Each of the ACK blocks 218, 220, 222, and 224 indicates to the AP the successful receipt of the data at the respective access terminal.

It should be noted that between each message exchanged between the AP and the access terminals AT1-AT4, there exists a period of time during which no information is transmitted. This period of time may be referred to as a short interframe space (SIFS) or some other nomenclature. The purpose of the SIFS is to increase the speed of data exchange between the AP and the access terminals AT1-AT4 by limiting the amount of time the AP or the access terminals can take to respond, and by limiting the amount of time the AP and the access terminals receiving the response must remain in the receiving mode. The SIFS also provides an opportunity for the access terminals and the access points to process the received messages and check for error, so that the access terminals can decide wither to transmit the ACK block indicating the successful receipt of the respective data blocks.

Further, it should be noted that the transmission of the FCR, FCL, RTS, and CTS messages from either the AP or the access terminals AT1-AT4 triggers a response in access terminals or devices that are within range of the transmission, but for which the specific message was not intended. This response protects the transmissions from the transmitting device on the respective channel for a predetermined duration and may be referred to as a network allocation vector (NAV) response. The predetermined duration of the NAV response may likewise be referred to as NAV duration. As shown in FIG. 2A, the AP and the access terminals AT1-AT4 use the NAV duration to spoof the actual time the channels will be occupied in order to protect the channels from outside interference by hidden access terminals. Examples of the NAV durations set by the AP and access terminals AT1-AT4 are shown in FIG. 2A, and are designated as AP NAV, AT1 NAV, AT2 NAV, AT3 NAV, and AT4 NAV.

Figure 2B:
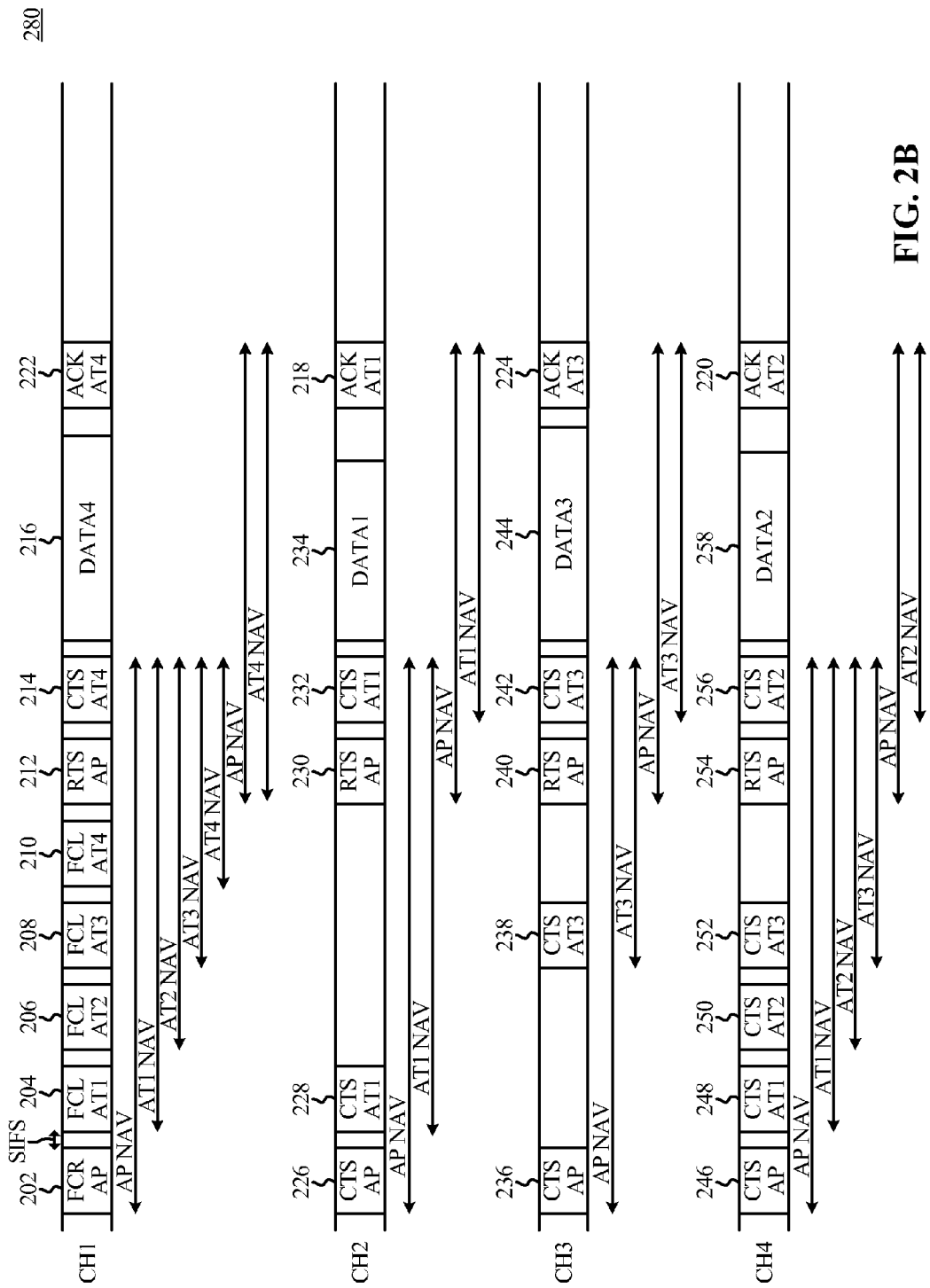
FIG. 2B illustrates a time line of message events in another channel allocation mechanism.

FIG. 2B illustrates a time line of message events in a channel allocation mechanism 280. The mechanism 280 is similar to the mechanism 200 of FIG. 2A, but differs in the resource utilization for the transmission of ACK messages 218, 220, 222 and 224. Specifically, as shown in FIG. 2B, the ACK messages may be transmitted simultaneously by the access terminals AT1-AT4 across the channels CH1, CH2, CH3 and CH4, respectively. Here, the ACK messages are transmitted by the access terminals AT1-AT4 across the channels on which they received the transmission from the AP.

Figure 3:
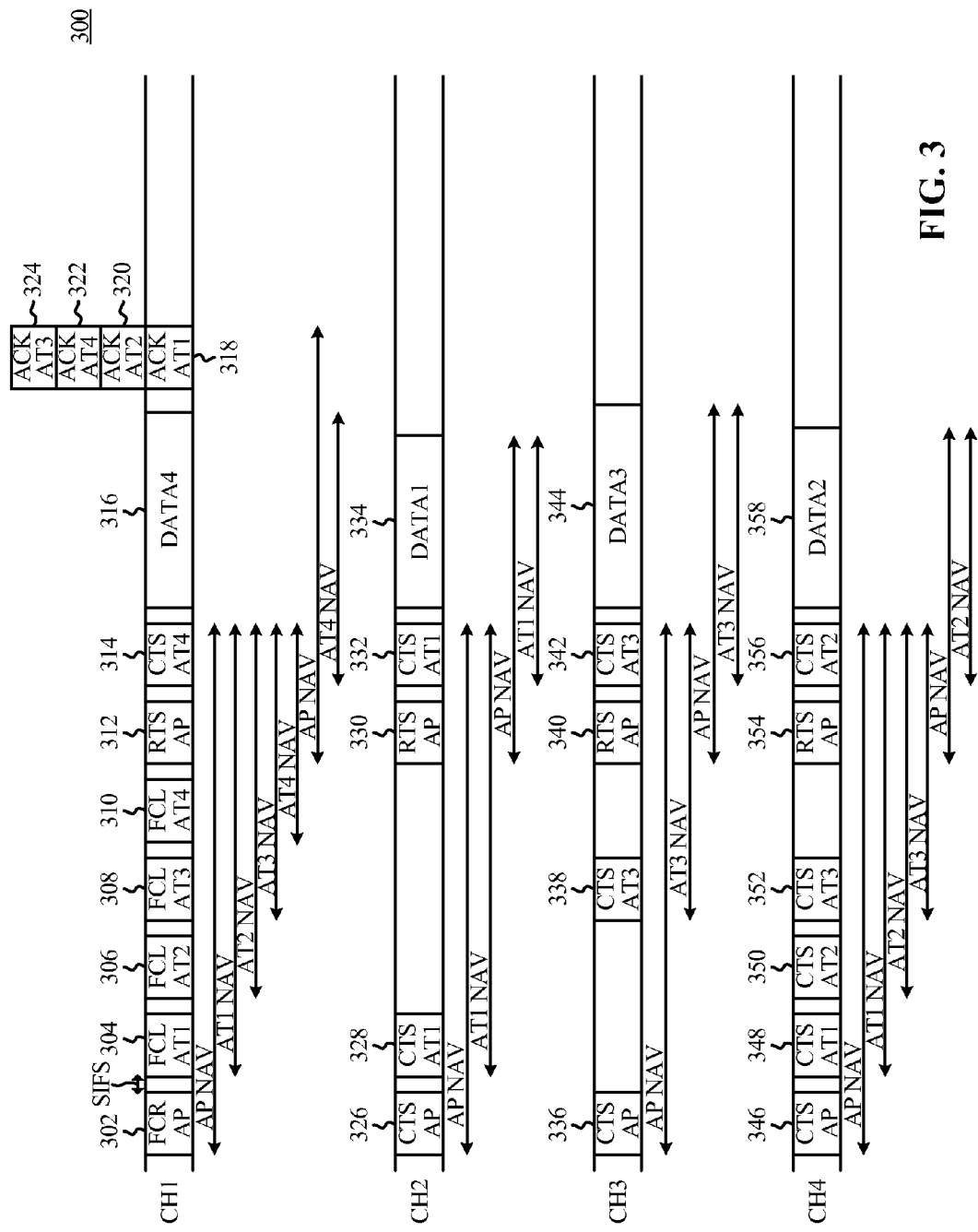
FIG. 3 illustrates a time line of message events in yet another channel allocation mechanism.

FIG. 3 illustrates a time line of message events in a channel allocation mechanism 300. The mechanism 300 is similar to the mechanism 200 of FIG. 2A, but differs in the transmission of ACK messages 318, 320, 322, and 324. Specifically, as shown in FIG. 3, the ACK messages may be transmitted simultaneously by the access terminals AT1-AT4 across channel CH1 via the SDMA mechanism. Upon receipt by the AP, the ACK messages are separated and simultaneously decoded on the basis of their spatial position relative to the AP receive antennas. In this manner, the channel allocation mechanism 300 may substantially reduce the duration of transmission across channel CH1.

The mechanism of transmitting FCR AP, FCL AT1-AT4, CTS AP, CTS AT1-AT4, RTS AP, and DATA1-DATA4 messages 302-316 and 326-358 of FIG. 3 correspond to that of messages 202-216 and 226-258 of FIG. 2A, respectively, and as such, their respective descriptions are omitted.

Figure 4:
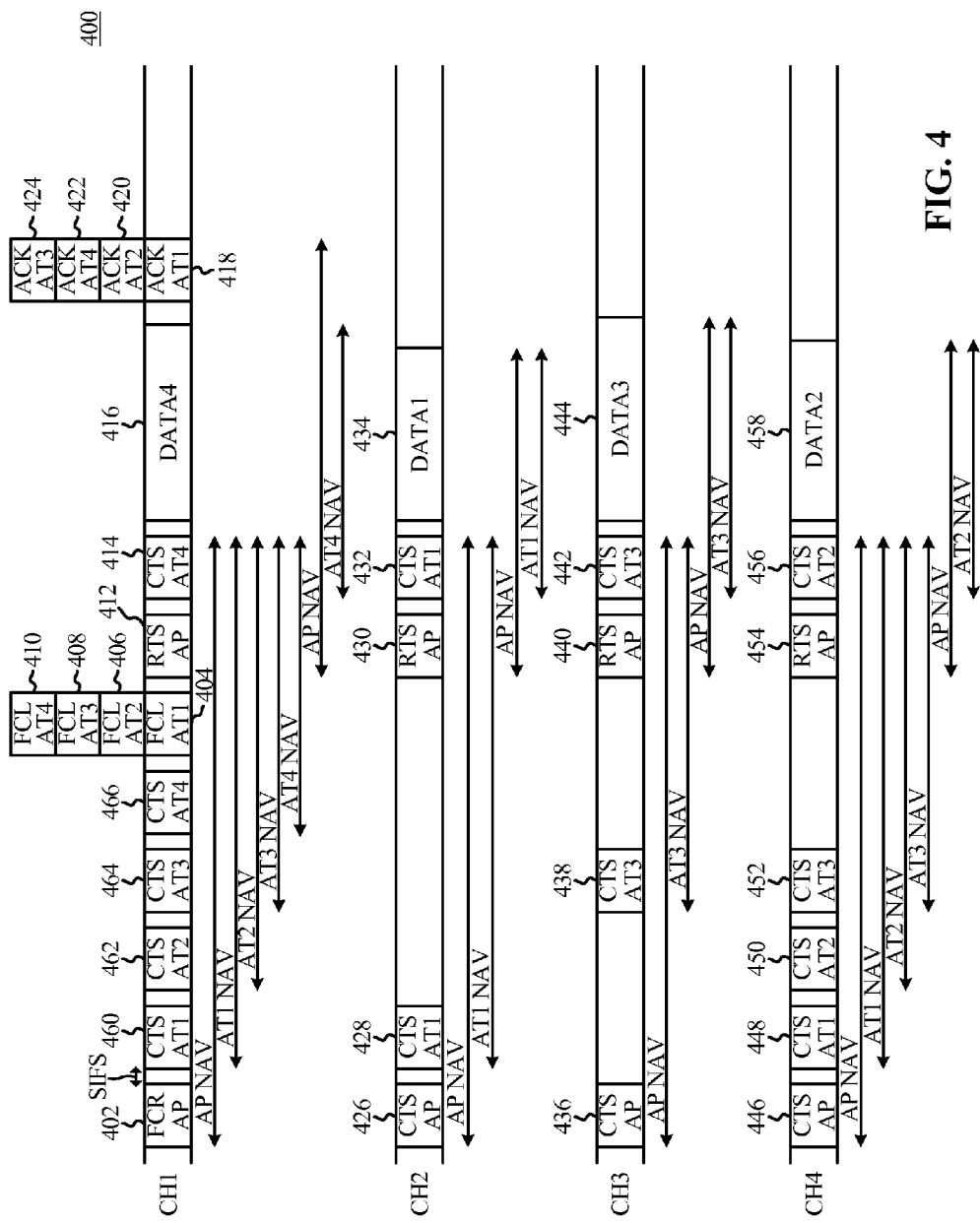
FIG. 4 illustrates a time line of message events in a further channel allocation mechanism.

FIG. 4 illustrates a time line of message events in a channel allocation mechanism 400. The mechanism 400 differs from the mechanism 300 of FIG. 3 in a few ways. As shown in FIG. 4, free channel list response messages FCL AT1 404, FCL AT2 406, FCL AT3 408, and FCL AT4 410 may be transmitted simultaneously by the access terminals AT1-AT4 across channel CH1 via the SDMA mechanism.

The AP separates and simultaneously decodes the FCL messages as it does ACK messages 418-424.

The mechanism 400 also includes transmission of additional CTS messages CTS AT1 460, CTS AT2 462, CTS AT3 464, and CTS AT4 466 from the access terminals AT1-AT4 to the AP across channel CH1. These CTS messages are transmitted according to a transmission schedule embedded within FCR AP 402. As with the transmission of CTS messages CTS AT1-AT4 across channels CH2-CH4, the CTS message transmitted from each of the access terminals AT1-AT4 to the AP across channel CH1 indicates to the AP that it is free to transmit a response across channel CH1 to the respective access terminals AT1-AT4.

The mechanism of transmitting FCR AP, CTS AP, CTS AT1-AT4, RTS AP, and DATA1-DATA4 messages 402, and 412-458 of FIG. 4 correspond to that of messages 302 and 312-358 of FIG. 3, respectively, and as such, their respective descriptions are omitted.

Figure 5:
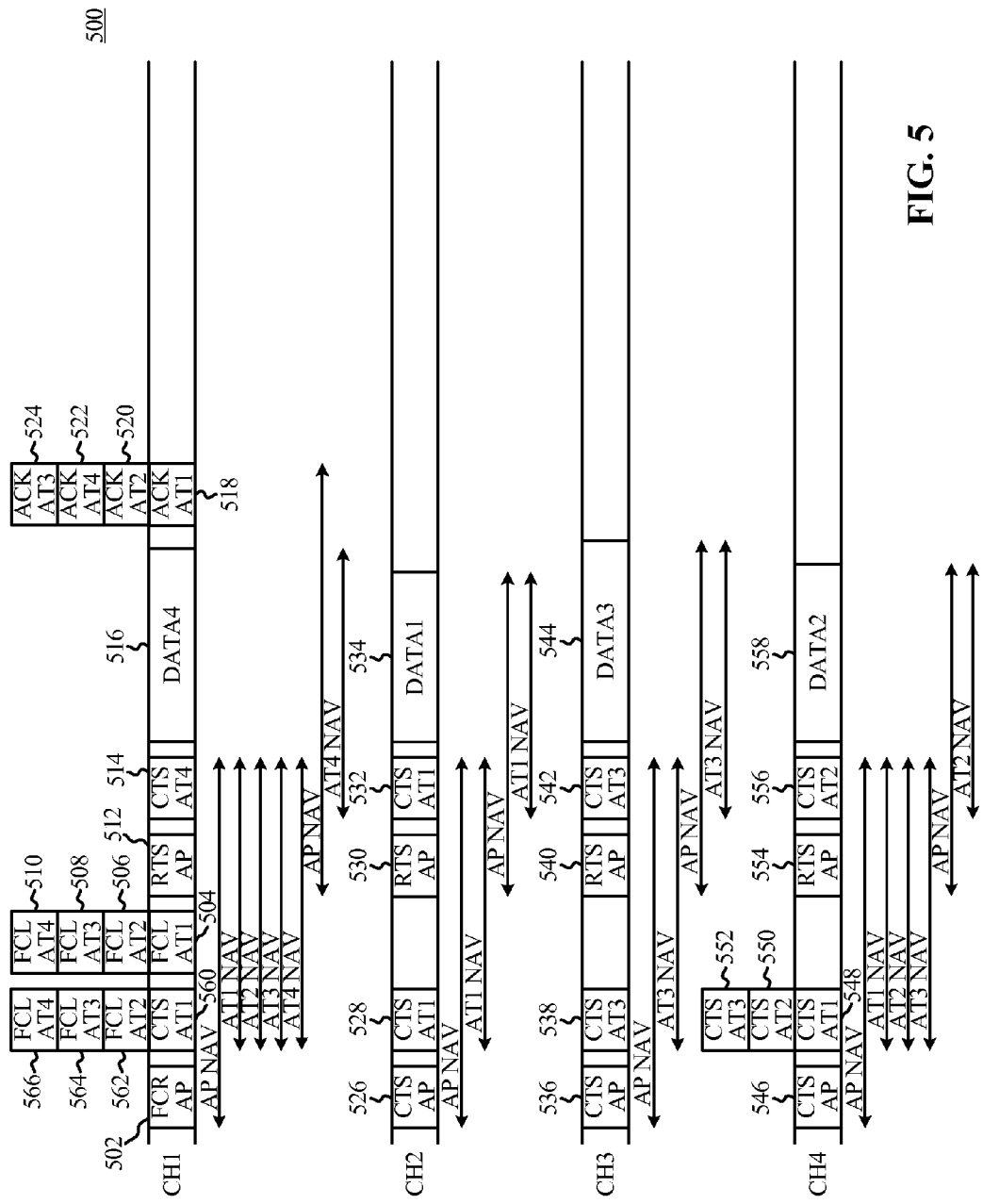
FIG. 5 illustrates a time line of message events in a further channel allocation mechanism.

FIG. 5 illustrates a time line of message events in a channel allocation mechanism 500. The mechanism 500 is similar to the mechanism 400 of FIG. 4, but differs in the transmission of CTS messages 548, 550, 552, 560, 562, 564, and 566. Specifically, as shown in FIG. 5, the CTS messages CTS AT1 548, CTS AT2 550, and CTS AT3 552 may be transmitted simultaneously by the access terminals AT1-AT3 across channel CH4 via the SDMA mechanism. Similarly, the CTS messages CTS AT1 560, CTS AT2 562, CTS AT3 564, and CTS AT4 566 may be transmitted simultaneously by the access terminals AT1-AT4 across channel CH1 via the SDMA mechanism. Upon receipt of the CTS messages, the AP separates and simultaneously decodes the CTS messages, and proceeds to receive and similarly separate and simultaneously decode the FCL messages 504-510 in order to compute transmission schedules for the access terminals AT1-AT4 and allocate the channels CH1-CH4.

The mechanism of transmitting messages 502-546 and 554-558 of FIG. 5 correspond to that of messages 402-446 and 454-458 of FIG. 4, respectively, and as such, their respective descriptions are omitted.

Figure 6:
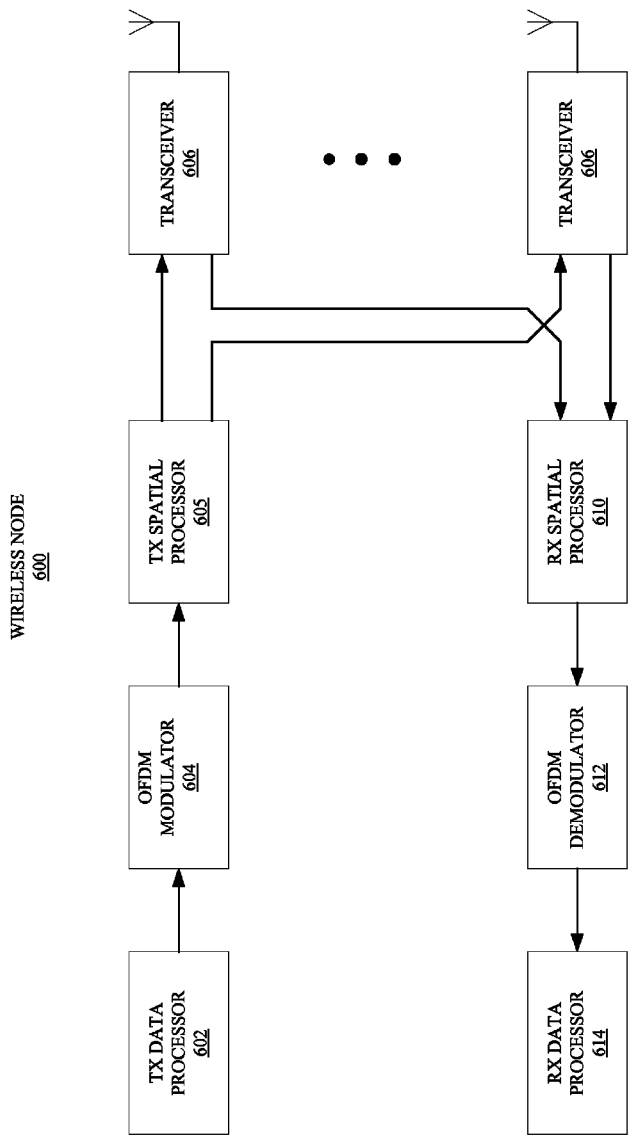
FIG. 6 is a block diagram of an example of signal processing functions of a PHY layer of a wireless node in the wireless communications network of FIG. 1.

FIG. 6 is a conceptual block diagram illustrating an example of the PHY layer. In a transmit mode, a TX data processor 602 may be used to receive data from the MAC layer and encode (e.g., Turbo code) the data to facilitate forward error correction (FEC) at the receiving node. The encoding process results in a sequence of code symbols that may be blocked together and mapped to a signal constellation by the TX data processor 602 to produce a sequence of modulation symbols.

In wireless nodes implementing OFDM, the modulation symbols from the TX data processor 602 may be provided to an OFDM modulator 604. The OFDM modulator splits the modulation symbols into parallel streams. Each stream is then mapped to an OFDM subcarrier and then combined together using an Inverse Fast Fourier Transform (IFFT) to produce a time domain OFDM stream.

A TX spatial processor 606 performs spatial processing on the OFDM stream. This may be accomplished by spatially precoding each OFDM and then providing each spatially precoded stream to a different antenna 608 via a transceiver 606. Each transmitter 606 modulates an RF carrier with a respective precoded stream for transmission over the wireless channel.

In a receive mode, each transceiver 606 receives a signal through its respective antenna 608. Each transceiver 606 may be used to recover the information modulated onto an RF carrier and provide the information to a RX spatial processor 610.

The RX spatial processor 610 performs spatial processing on the information to recover any spatial streams destined for the wireless node 600. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 600, they may be combined by the RX spatial processor 610.

In wireless nodes implementing OFDM, the stream (or combined stream) from the RX spatial processor 610 is provided to an OFDM demodulator 612. The OFDM demodulator 612 converts the stream (or combined stream) from time-domain to the frequency domain using a Fast Fourier Transfer (FFT). The frequency domain signal comprises a separate stream for each subcarrier of the OFDM signal. The OFDM demodulator 612 recovers the data (i.e., modulation symbols) carried on each subcarrier and multiplexes the data into a stream of modulation symbols.

A RX data processor 614 may be used to translate the modulation symbols back to the correct point in the signal constellation. Because of noise and other disturbances in the wireless channel, the modulation symbols may not correspond to an exact location of a point in the original signal constellation. The RX data processor 614 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 614 then uses the sequence of code symbol LLRs in order to decode the data that was originally transmitted before providing the data to the MAC layer.

Figure 7:
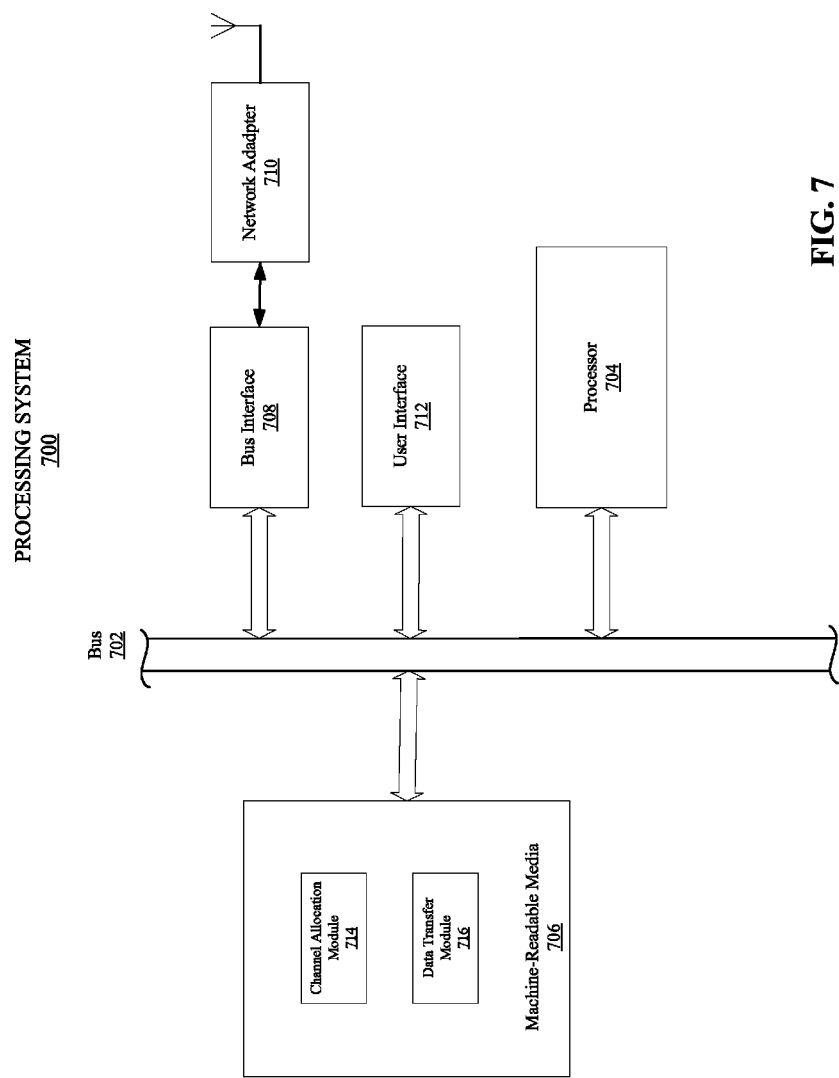
FIG. 7 is a block diagram illustrating an exemplary hardware configuration for a processing system in a wireless node in the wireless communications network of FIG. 1.

FIG. 7 is a conceptual diagram illustrating an example of a hardware configuration for a processing system in a wireless node. In this example, the processing system 700 may be implemented with a bus architecture represented generally by bus 702. The bus 702 may include any number of interconnecting buses and bridges depending on the specific application of the processing system 700 and the overall design constraints. The bus links together various circuits including a processor 704, machine-readable media 706, and a bus interface 708. The bus interface 708 may be used to connect a network adapter 710, among other things, to the processing system 700 via the bus 702. The network interface 710 may be used to implement the signal processing functions of the PHY layer. In the case of an access terminal 110 (see FIG. 1), a user interface 712 (e.g., keypad, display, mouse, joystick, etc.) may also be connected to the bus. The bus 702 may also link various other circuits such as timing sources, peripherals, voltage regulators, power management circuits, and the like, which are well known in the art, and therefore, will not be described any further.

The processor 704 is responsible for managing the bus and general processing, including the execution of software stored on the machine-readable media 706. The processor 704 may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable may be embodied in a computer-program product. The computer-program product may comprise packaging materials.

In the hardware implementation illustrated in FIG. 7, the machine-readable media 706 is shown as part of the processing system 700 separate from the processor 704. However, as those skilled in the art will readily appreciate, the machine-readable media 706, or any portion thereof, may be external to the processing system 700. By way of example, the machine-readable media 706 may include a transmission line, a carrier wave modulated by data, and/or a computer product separate from the wireless node, all which may be accessed by the processor 704 through the bus interface 708. Alternatively, or in addition to, the machine readable media 706, or any portion thereof, may be integrated into the processor 704, such as the case may be with cache and/or general register files.

The processing system 700 may be configured as a general-purpose processing system with one or more microprocessors providing the processor functionality and external memory providing at least a portion of the machine-readable media 706, all linked together with other supporting circuitry through an external bus architecture. Alternatively, the processing system 700 may be implemented with an ASIC (Application Specific Integrated Circuit) with the processor 704, the bus interface 708, the user interface 712 in the case of an access terminal), supporting circuitry (not shown), and at least a portion of the machine-readable media 706 integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system 700 depending on the particular application and the overall design constraints imposed on the overall system.

The machine-readable media 706 is shown with a number of software modules. The software modules include instructions that when executed by the processor 704 cause the processing system 700 to perform various functions. Each software module may reside in a single storage device or distributed across multiple storage devices. By way of example, a software module may be loaded into RAM from a hard drive when a triggering event occurs. During execution of the software module, the processor 704 may load some of the instructions into cache to increase access speed. One or more cache lines may then be loaded into a general register file for execution by the processor 704. When referring to the functionality of a software module below, it will be understood that such functionality is implemented by the processor 704 when executing instructions from that software module.

The machine-readable media is shown with a channel allocation module 714 and a data transfer module 716. The channel allocation module 714 may be used to implement all or part of a channel allocation process at the wireless nodes, such as the AP 110 and the various access terminals AT 120 and AT1-AT4, for example. The data transfer module 716 may be used to control the transfer of data blocks (e.g., DATA1-DATA4) and acknowledgement messages (e.g., ACK AT1-ACK AT4) between the wireless nodes.

An example of the channel allocation and data transfer process 800, such as that which may be implemented via the combination of the channel allocation module 714 and the data transfer module 716, will now be described with respect to the flow chart illustrated in FIG. 8. The channel allocation and data transfer process 800 may be implemented specifically at a wireless node (e.g., AP) responsible for allocating channels to various other wireless nodes (e.g., AT). More specifically, the process of block 802, as well as that of blocks 804-808 may be performed by the channel allocation module 714 of the AP, whereas the process of blocks 810-812 may be performed by the data transfer module 716 of the AP, for example.

Figure 8:
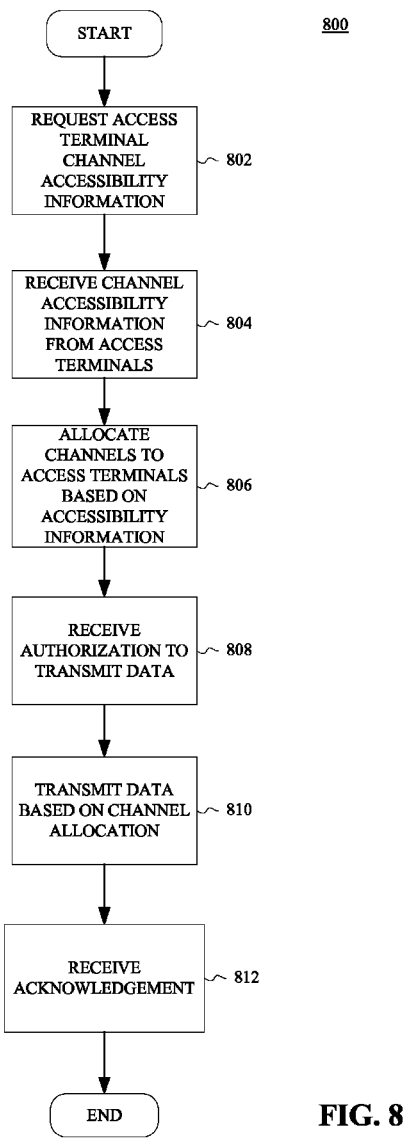
FIG. 8 is a flow chart diagram illustrating a channel allocation and data transfer process.

As shown in FIG. 8, in block 802, a request for access terminal channel access information is made. For example, an AP may transmit a FCR message to a plurality of access terminals with a list of channels available to the AP and triggering the plurality of access terminals to respond with a channel accessibility list of their own.

In block 804, channel accessibility information is received. For example, the AP may receive the FCL message from each of the access terminals indicating the channels that are available to that access terminal.

In block 806, the channels are allocated to the access terminals based on the received accessibility information. For example, the AP may allocate one of the channels to each of the access terminals, and signal each access terminal that it is ready to transmit data.

In block 808, an authentication to transmit data is received. For example, the AP may receive a CTS message from each of the access terminals indicating that the AP is clear to transmit the data on the respective channels.

In block 810, the data is transmitted to the access terminals based on the channel allocation. For example, the AP may transmit a particular DATA block to each of the access terminals across the specific allocated channel.

In block 812, an acknowledgement is received and the process ends. For example, the access terminals may each transmit an acknowledgement message indicating the receipt of the respective DATA blocks.

Another example of a channel allocation process 900, such as that which may also be implemented via the combination of the channel allocation module 714 and the data transfer module 716, will now be described with respect to the flow chart illustrated in FIG. 9. The channel allocation process 900 may be implemented specifically at a wireless node (e.g., AT) responsible for assisting in the allocation of channels by another wireless node (e.g., AP). More specifically, the process of block 902-910 may be performed by the channel allocation module 714 of the AT, whereas the process of blocks 912-914 may be performed by the data transfer module 716 of the AT, for example.

Figure 9:
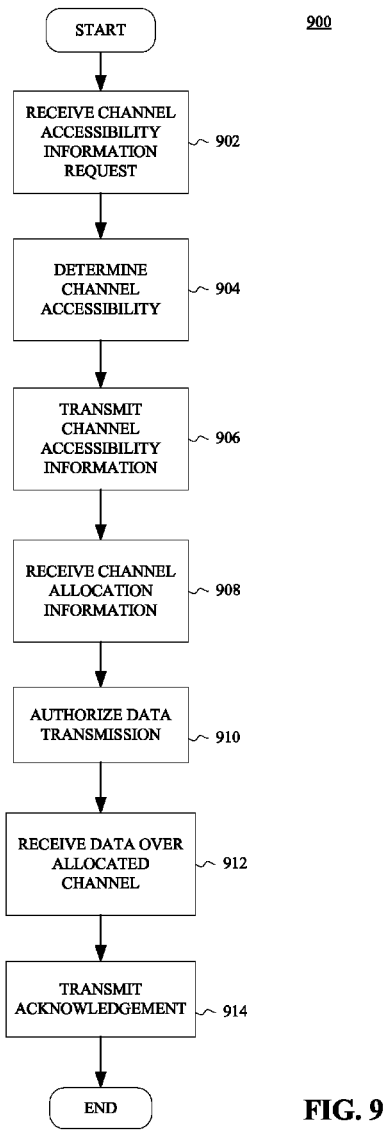
FIG. 9 is a flow chart diagram illustrating another channel allocation and data transfer process.

As shown in FIG. 9, in block 902, a request for channel access information is received. For example, each of a plurality of access terminals may receive a FCR message from an AP requesting a response with a list of channels available to the respective access terminal.

In block 904, the channels available to the access terminal are determined. For example, each of the access terminals may determine which of the channels are available to the access terminal.

In block 906, the channel accessibility information is transmitted. For example, each of the access terminals may transmit an FCL message indicating the channels that are available to that access terminal.

In block 908, channel allocation information is received. For example, each of the access terminals may receive an RTS message over a respective channel, inherently allocating that channel to the access terminal.

In block 910, data transmission is authorized. For example, each the access terminals may transmit a CTS message to the AP across their respective allocated channels indicating that the AP may transmit data.

In block 912, data is received over the allocated channel. For example, the access terminals may each receive DATA blocks from the AP across their respective allocated channels.

In block 914, an acknowledgment is transmitted. For example, each of the access terminals may transmit an acknowledgment message ACK to the AP indicating receipt of the respective DATA blocks.

Figure 10:
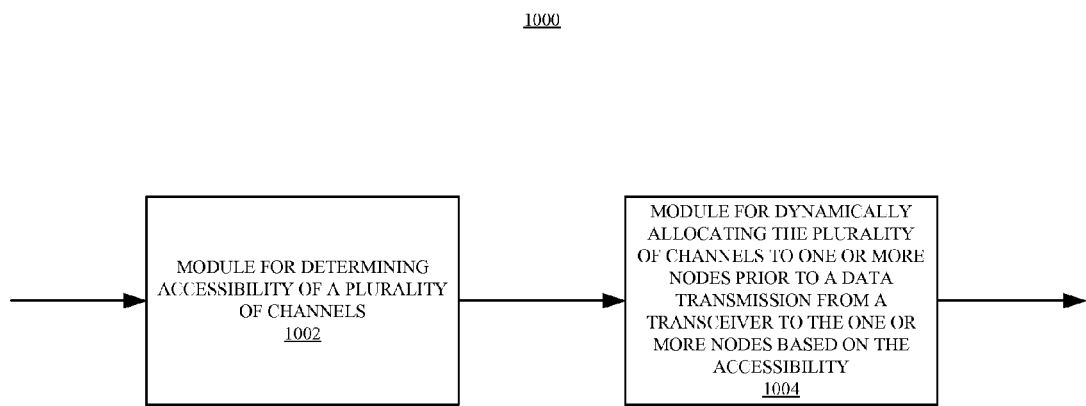
FIG. 10 is a block diagram illustrating an example of the functionality of an apparatus.

FIG. 10 is a block diagram illustrating an example of the functionality of an apparatus. In this example, the apparatus 1000 includes a module 1002 for determining accessibility of a plurality of channels, and a module 1004 for dynamically allocating the plurality of channels to one or more nodes prior to a data transmission from a transceiver to the one or more nodes based on the accessibility. The module 1002 may be implemented by the access point AP 110 (see FIG. 1) described above or by some other suitable means. Likewise, the module 1004 may also be implemented by the access point AP 110 or by some other suitable means.

Figure 11:
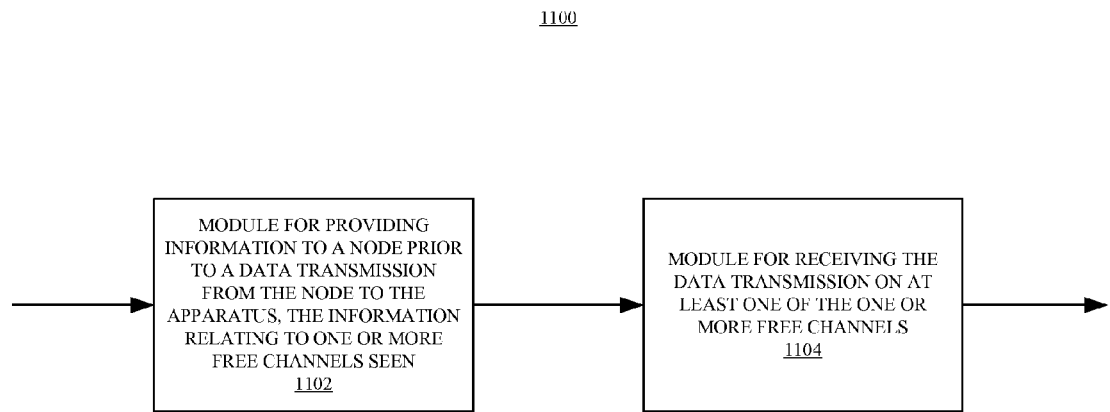
FIG. 11 is a block diagram illustrating an example of the functionality of another apparatus.

FIG. 11 is a block diagram illustrating an example of the functionality of an apparatus. In this example, the apparatus 1100 includes a module 1102 for providing information to a node prior to a data transmission from the node to the apparatus, the information relating to one or more free channels seen, and a module 1104 for receiving the data transmission on at least one of the one or more free channels. The module 1102 may be implemented by the access terminal AT 120 described above or by some other suitable means. Likewise, the module 1104 may also be implemented by the access terminal AT 120 or by some other suitable means.

Figure 12:
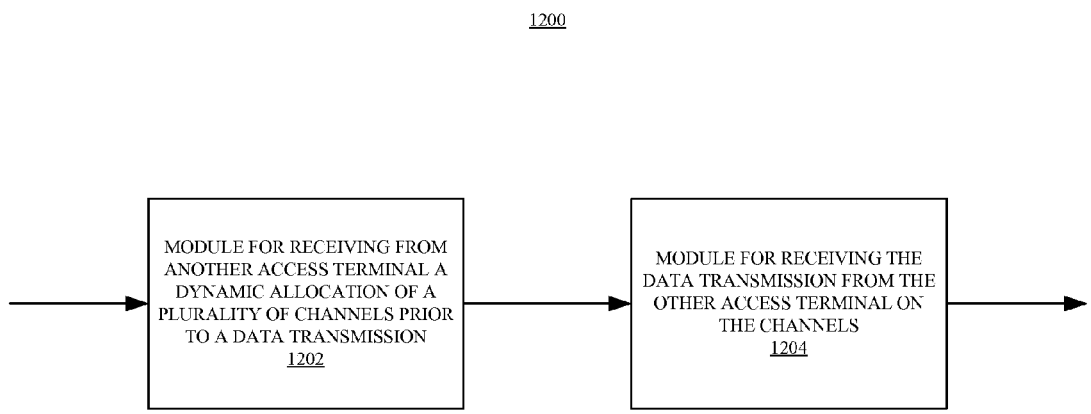
FIG. 12 is a block diagram illustrating an example of the functionality of yet another apparatus.

FIG. 12 is a block diagram illustrating an example of the functionality of an apparatus. In this example, the apparatus 1200 includes a module 1202 for receiving from another access terminal a dynamic allocation of a plurality of channels prior to a data transmission, and a module 1204 for receiving the data transmission from said another access terminal on the channels. The module 1202 may be implemented by the access terminal AT 120 described above or by some other suitable means. Likewise, the module 1204 may also be implemented by the access terminal AT 120 or by some other suitable means.

It is understood that any specific order or hierarchy of steps described in the context of a software module is being presented to provide an examples of a wireless node. Based upon design preferences, it is understood that the specific order or hierarchy of steps may be rearranged while remaining within the scope of the invention.

Although various aspects of the present invention have been described as software implementations, those skilled in the art will readily appreciate that the various software modules presented throughout this disclosure may be implemented in hardware, or any combination of software and hardware. Whether these aspects are implemented in hardware or software depends upon the particular application and design constraints imposed on the overall system. Skilled artisans may implement the described functionality in varying ways for each particular application, but such implementation decisions should not be interpreted as causing a departure from the scope of the invention.

The previous description is provided to enable any person skilled in the art to fully understand the full scope of the invention. Modifications to the various configurations disclosed herein will be readily apparent to those skilled in the art. Thus, the claims are not intended to be limited to the various aspects of the invention described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for communications, comprising:
   a transceiver; and
   a processing system configured to allocate a plurality of channels to a plurality of nodes prior to a data transmission from the transceiver to the nodes, and
   wherein the transceiver is further configured to transmit data to the nodes on the channels allocated to the nodes, and to receive acknowledgements from the nodes on a plurality of spatial streams in one of the channels allocated to the nodes.

2. The apparatus of claim 1 wherein the channels include a plurality of frequency channels.

3. The apparatus of claim 1 wherein the processing system is further configured to:
   embed channel reservation information in at least one request-to-send message, and the transceiver is further configured to:
   transmit the at least one request-to-send message on at least one of the channels allocated to the nodes.

4. The apparatus of claim 3 wherein the channel reservation information relates to a time duration for sending data on the channel on which the request-to-send message was transmitted.

5. The apparatus of claim 1 wherein each of the acknowledgements comprises a block acknowledgement.

6. An apparatus for communications, comprising:
   a processing system configured to receive an allocation of a plurality of channels prior to a data transmission; and
   a transceiver configured to receive the data transmission on the channels, and
   wherein the transceiver is further configured to transmit an acknowledgement after receiving the data transmission on one of a plurality of spatial streams in one of the allocated channels in which at least one acknowledgement is sent by another apparatus.

7. The apparatus of claim 6 wherein the channels comprise a plurality of frequency channels.

8. The apparatus of claim 6 wherein the transceiver is further configured to:
   receive a channel reservation message for the data transmission on at least one of the channels; and wherein the processing system is further configured to process the channel reservation message.

9. The apparatus of claim 8 wherein the channel reservation message indicates a time duration for the data transmission.

10. The apparatus of claim 6 wherein the acknowledgement comprises a block acknowledgement.

11. A method for communications, comprising:
allocating a plurality of channels to a plurality of nodes prior to a data transmission from a transceiver to the nodes; and
transmitting data to the nodes on the channels allocated to the nodes, and receiving acknowledgements from the nodes on a plurality of spatial streams in one of the channels allocated to the nodes.

12. The method of claim 11 wherein the channels include a plurality of frequency channels.

13. The method of claim 11 further comprising:
embedding channel reservation information in at least one request-to-send message; and
transmitting the at least one request-to-send message on at least one of the channels allocated to the nodes.

14. The method of claim 13 wherein the channel reservation information relates to a time duration for sending data on the channel on which the request-to-send message is transmitted.

15. The method of claim 11 wherein each of the acknowledgements comprises a block acknowledgement.

16. A method for communications, comprising:
receiving an allocation of a plurality of channels prior to a data transmission;
receiving the data transmission on the channels; and
transmitting an acknowledgement after receiving to the data transmission on one of a plurality of spatial streams in one of the allocated channels in which at least one acknowledgement is sent by an access terminal.

17. The method of claim 16 wherein the channels comprise a plurality of frequency channels.

18. The method of claim 16 further comprising receiving a channel reservation message for the data transmission on at least one of the channels and processing the channel reservation message.

19. The method of claim 18 wherein the channel reservation message indicates a time duration for the data transmission.

20. The method of claim 16 wherein the acknowledgement comprises a block acknowledgement.

21. An apparatus for communications, comprising:
means for determining accessibility of a plurality of channels;
means for allocating the plurality of channels to a plurality of nodes prior to a data transmission from a transceiver to the nodes based on the accessibility; and
means for transmitting data to the nodes on the channels allocated to the nodes, and receiving acknowledgements from the nodes on a plurality of spatial streams in one of the channels allocated to the nodes.

22. An apparatus for communications, comprising:
means for receiving an allocation of a plurality of channels prior to a data transmission;
means for receiving the data transmission on the channels; and
means for transmitting an acknowledgement after receiving the data transmission on one of a plurality of spatial streams in one of the allocated channels in which at least one acknowledgement is sent by another apparatus.

23. An access point, comprising:
at least one antenna;
a transceiver; and
a processing system configured to allocate a plurality of channels to a plurality of nodes prior to a data transmission from the transceiver to the nodes, and
wherein the transceiver is further configured to transmit data to the nodes via the at least one antenna on the channels allocated to the nodes, and to receive acknowledgements from the nodes via the at least one antenna on a plurality of spatial streams in one of the channels allocated to the nodes.

24. A non-transitory computer-readable medium encoded with instructions executable to:
allocate a plurality of channels to a plurality of nodes prior to a data transmission from a transceiver to the nodes; and
transmit data to the nodes on the channels allocated to the nodes, and to receive acknowledgements from the nodes on a plurality of spatial streams sub-channels in one of the channels allocated to the nodes.

25. A non-transitory computer-readable medium encoded with instructions executable to:
receive an allocation of a plurality of channels prior to a data transmission;
receive the data transmission on the channels; and
transmit an acknowledgement after receiving the data transmission on one of a plurality of spatial streams in one of the allocated channels in which at least one acknowledgement is sent by an access terminal.

26. An access terminal, comprising:
at least on antenna;
a processing system configured to receive an allocation of a plurality of channels prior to a data transmission; and
a transceiver configured to receive, via the at least one antenna, the data transmission on the channels, and wherein the transceiver is further configured to transmit, via the at least one antenna, an acknowledgement after receiving the data transmission on one of a plurality of spatial streams in one of the allocated channels in which at least one acknowledgement is sent by another access terminal.

* * * * *